US007400328B1

(12) United States Patent
Ye et al.

(10) Patent No.: US 7,400,328 B1

(45) Date of Patent: Jul. 15, 2008

(54) COMPLEX-SHAPED VIDEO OVERLAY USING MULTI-BIT ROW AND COLUMN INDEX REGISTERS

(75) Inventors: Bo Ye, Cupertino, CA (US); Jimmy Yang, Saratoga, CA (US); Edmund Cheung, Palo Alto, CA (US)

(73) Assignee: NeoMagic Corp., Santa Clara, CA (US)

( * ) Notice: Subject to any disclaimer, the term of this patent is extended or adjusted under 35 U.S.C. 154(b) by 759 days.

(21) Appl. No.: 10/906,409

(22) Filed: Feb. 18, 2005

(51) Int. Cl.
*G06F 13/00* (2006.01)
*G09G 5/00* (2006.01)

(52) U.S. Cl. ....................... 345/537; 345/558; 345/559; 345/531; 345/589; 345/629

(58) Field of Classification Search ................. 345/537, 345/545, 558, 559, 531, 589, 629
See application file for complete search history.

(56) References Cited

U.S. PATENT DOCUMENTS

| | | | | |
|---|---|---|---|---|
| 4,688,033 A | 8/1987 | Carini et al. | ................ | 345/560 |
| 5,001,469 A | 3/1991 | Pappas et al. | ............... | 715/790 |
| 5,065,231 A | 11/1991 | Greaves et al. | .............. | 348/599 |
| 5,220,312 A | 6/1993 | Lumelsky et al. | ........... | 345/563 |
| 5,351,067 A | 9/1994 | Lumelsky et al. | ........... | 345/561 |
| 5,638,467 A * | 6/1997 | Chua et al. | .................. | 382/298 |
| 5,644,333 A | 7/1997 | King et al. | .................. | 345/641 |
| 5,696,527 A | 12/1997 | King et al. | .................. | 345/634 |
| 5,883,610 A | 3/1999 | Jeon | ........................... | 345/629 |
| 5,889,499 A | 3/1999 | Nally et al. | .................... | 345/7 |
| 5,926,187 A | 7/1999 | Kim | ........................... | 345/629 |
| 5,986,676 A * | 11/1999 | Dwin et al. | ................. | 345/544 |
| 6,377,282 B1 | 4/2002 | Champion | .................. | 715/726 |
| 6,411,302 B1 * | 6/2002 | Chiraz | ........................ | 345/545 |
| 6,784,893 B2 | 8/2004 | Marino | ....................... | 345/561 |

* cited by examiner

*Primary Examiner*—Kee M. Tung
*Assistant Examiner*—David Lin
(74) *Attorney, Agent, or Firm*—gPatent LLC; Stuart T. Auvinen

(57) ABSTRACT

A graphics system reduces fetching from memory of color-key pixels when video pixels from a video-overlay window are displayed. A frame buffer is divided into multi-line, multi-pixel blocks that are arranged in block-rows and block-columns. Each block-row has primary and secondary row indicator bits and each block-column has two column indicator bits. When the primary row indicator bit is cleared, all pixels in the block-row are fetched from a frame-buffer memory. When the primary row indicator is set, a secondary row indicator bit selects either first or second column indicator bits for reading. When the selected column indicator bit for a block-column is set, fetching of pixels from the frame buffer memory is skipped. Instead, dummy color-key pixels are generated and inserted into the pixel stream. These dummy pixels match the color key and cause video pixels to be sent to the display. Memory fetching is reduced.

20 Claims, 8 Drawing Sheets

COMPLEX-SHAPED VIDEO OVERLAY USING MULTI-BIT ROW AND COLUMN INDEX REGISTERS

FIELD OF THE INVENTION

This invention relates to display systems, and more particularly to video overlay using block registers to insert a color key.

BACKGROUND OF THE INVENTION

Graphics data is typically generated by a computer such as a personal computer (PC). Sometimes display data from a different source is to be displayed. For example, a video clip may be played on a PC. While playing the video can occupy the whole display screen, oftentimes the video is played in a smaller window, with PC-generated graphics data such as icons, menus, and logos displayed around the video window.

When the computer refreshes, or sends a stream of pixels to the display, pixels for the PC-generated graphics data are fetched from a memory and sent to the display. Pixels within the video window area are sent instead of the graphics pixels when refresh reaches the video window.

FIG. 1 shows a prior art graphics system that fetches from a memory for both graphics pixels and for video-window pixels. Memory 102 may be one or more physical memories and stores frame buffer 104 and overlay buffer 106. Frame buffer 104 contains computer-generated graphics pixels, such as for displaying text, menus, icons, window borders, etc. Overlay buffer 106 contains video pixels that represent a video clip or other source that is typically originally captured with a camera or similar device.

Frame fetcher 110 reads graphics pixels from frame buffer 104 in a scan order, such as along display lines from left-to-right and then the lines from top to bottom. These graphics pixels from frame buffer 104 are sent through mux 116 to display 120.

Some of the graphics pixels are replaced by the computer with dummy pixels of a pre-determined color value. This pre-determined color value is not used for regular graphics pixels but is used as an indicator known as the color key. Graphics pixels fetched from frame buffer 104 by frame fetcher 110 are compared to the pre-determined color-key value by comparator 114. When the graphics pixel matches the color key, comparator 114 signals mux 116 to discard the graphics pixel and replace it with a video pixel that is sent to display 120 rather than the graphics pixel. Overlay fetcher 112 fetches video pixels from overlay buffer 106, making the video pixels available for mux 116.

The output from comparator 114, SEL_OV, can also be used to control overlay fetcher 112, which can prevent some unnecessary fetching of video pixels or control timing and pipelining.

While using a color key is useful, one problem is that memory 102 has to fetch two pixels for the video overlay region. The graphics pixel from frame buffer 104 is fetched for comparison by comparator 114, and the video pixel is fetched from overlay buffer 106 for display. Even though the graphics pixels matching the color key are discarded, they are still fetched from memory 102. Especially for larger video windows, many color-key pixels have to be fetched from memory 102 and then discarded. This double-fetching of pixels from memory 102 increased the bandwidth requirement for memory 102 and is undesirable.

The operating system (OS) or other software defines the screen area for the video-overlay window by filling in the area with pixels that have the color-key value. The software can ensure that other areas of the screen do not have pixels with the same value as the color key. While a simple rectangle could be defined as the video-overlay window, the use of menus, icons, and other graphical elements may cause the video-overlay window to have a more irregular shape.

FIG. 2 shows a video-overlay window that is partially obscured by drop-down menus and graphical icons. The frame buffer in the graphics memory contains graphics pixels for graphical elements such as a banner or application header 10, application footer 13, a graphical-user-interface (GUI) toolbar 11, which has links to generate one or more drop-down menus 22. Within application window 12, software may draw one or more icons 14, which the user may click on to launch other applications, or for other functions. In an actual system there may be many windows open, having different sizes, on various parts of the screen.

Color-key pixels are written by the OS or software to color-key region 16. The color key might be an unused color such as a certain shade of blue, but could be any color defined by the operating system, a program, or the user.

A video feed, such as from an external source or being played by a video or media player, writes video pixels to video-overlay buffer 18. The graphics controller reads lines of graphics pixels from the frame-buffer memory. Each pixel is compared to the color key value. For regions outside of color-key region 16, the graphics pixels have values that do not match the color-key value, so the graphics pixels are scanned to the display device and displayed on the screen.

When graphics pixels from within color-key region 16 are read from the frame buffer by the graphics controller, the pixels match the color key value. The graphics controller then discards the graphics pixels and replaces them with video pixels from video-overlay buffer 18. The final display screen has pixels from video-overlay buffer 18 replacing graphics pixels from color-key region 16.

Rather than use a color key, a rectangle might be defined for the video window. However, the operation of many operating systems can cause the video-overlay window to be non-rectangular. For example, when a user clicks on a menu name on GUI toolbar 11, the OS generates drop-down menu 22. Drop-down menu 22 is displayed on top of or over the video-overlay window, obscuring parts of the video-overlay window. The OS can over-write some of the color-key pixels in color-key region 16 with graphics pixels that display drop-down menu 22. These pixels no longer match the color-key value, so the final display screen has drop-down menu 22 obscuring parts of the video-overlay window. The graphics controller has to skip over some video pixels in video-overlay buffer 18 when drop-down menu 22 obscures part of color-key region 16.

What is desired is a graphics system that displays video-overlay windows. A graphics system that does not double-fetch both graphics and video pixels from a memory is desirable to reduce memory bandwidth requirements and power consumption.

DETAILED DESCRIPTION

The present invention relates to an improvement in video-overlay graphics. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that registers may be used to identify the location of the video-overlay window within a display frame. The registers contain window-indicator bits that indicate the presence of the overlay window. One or more row registers and one or more column registers may be used. The registers do not have to have window-indicator bits for every line and every column of pixels. Instead each indicator bit may indicate the video-overlay window for a range of rows and columns. Having multiple indicator bits can allow for more complex window shapes than a simple rectangular box, such as when a drop-down menu obscures part of the video-overlay window.

Figure 1:
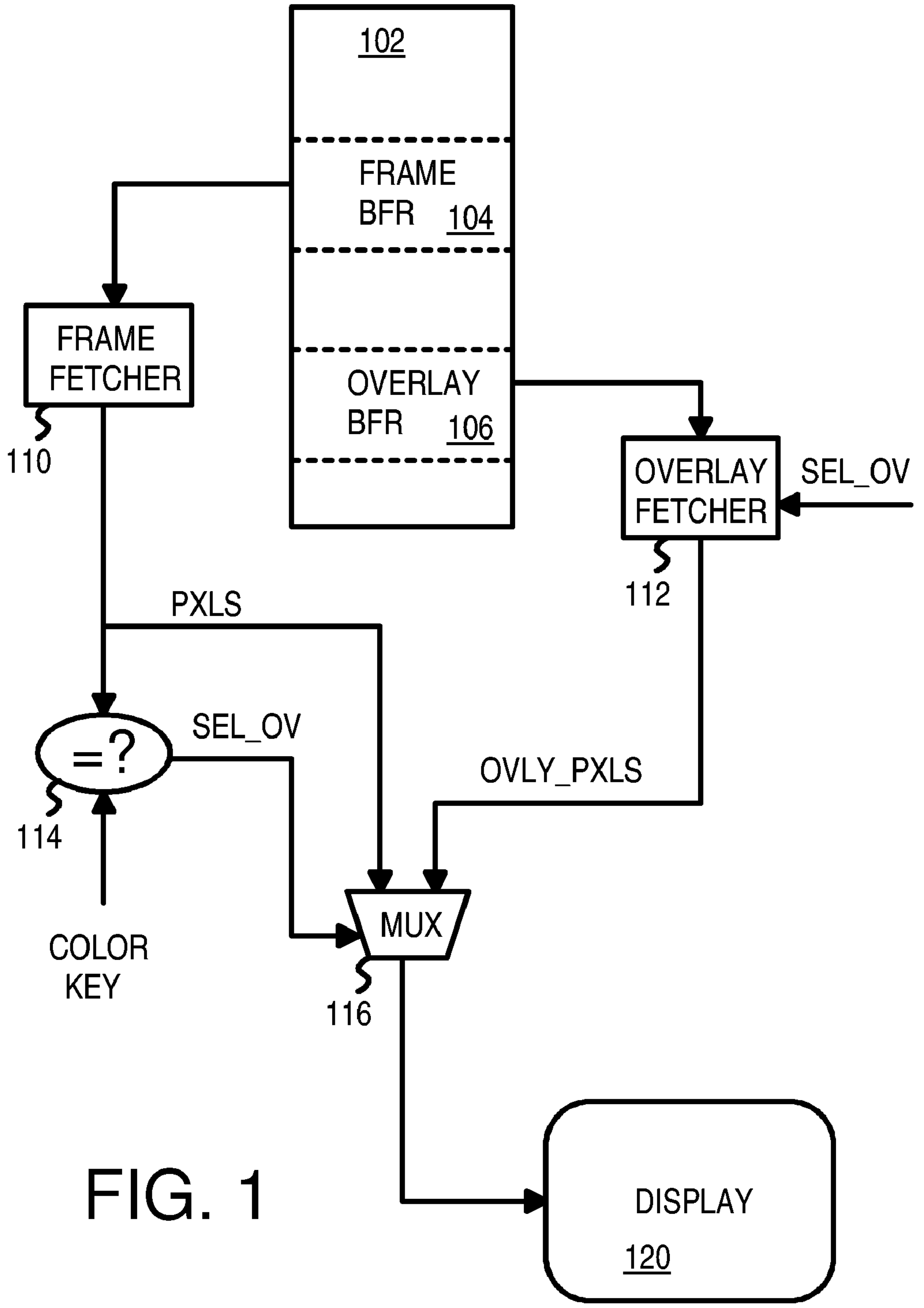
FIG. 1 PRIOR ART
FIG. 1 shows a prior art graphics system that fetches from a memory for both graphics pixels and for video-window pixels.
Figure 2:
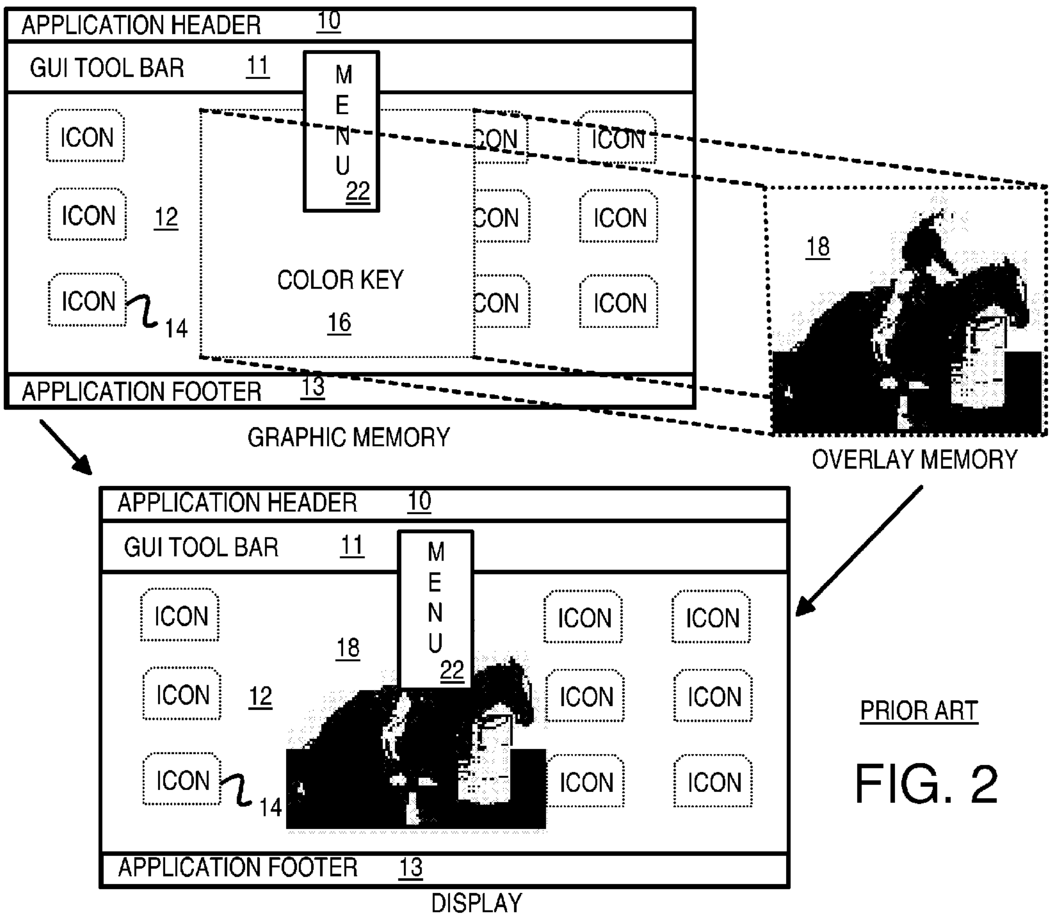
PRIOR ART FIG. 2
FIG. 2 shows a video-overlay window that is partially obscured by drop-down menus and graphical icons.
Figure 3:
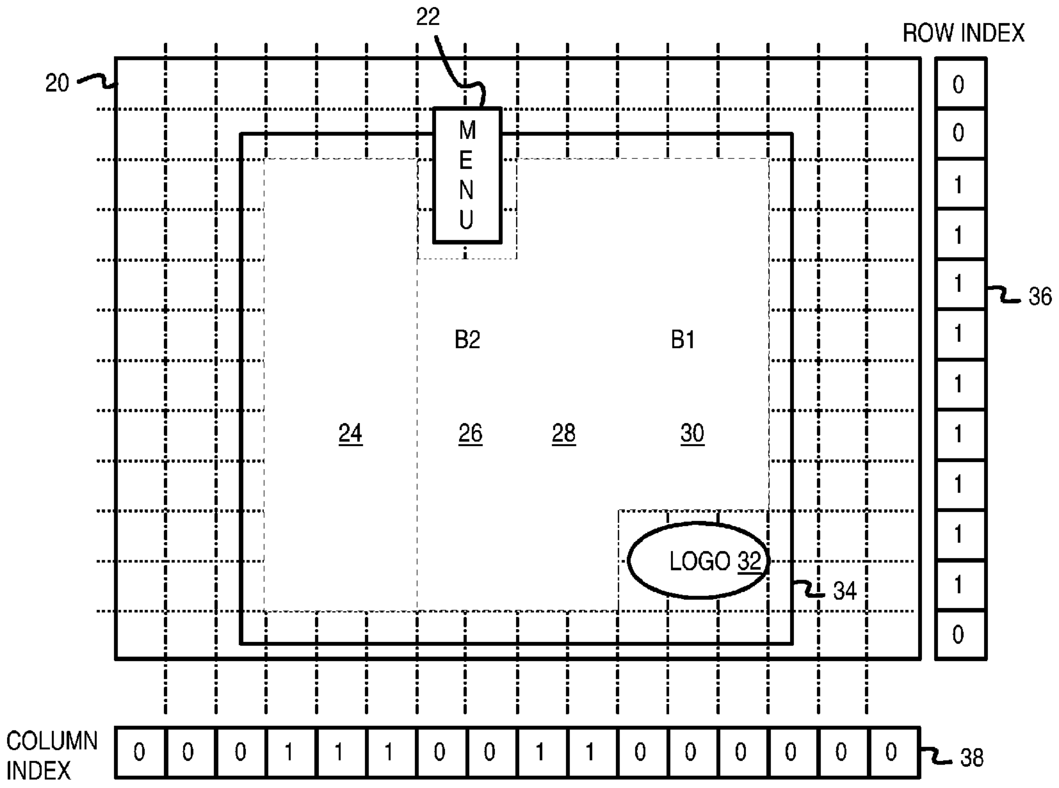
FIG. 3 shows 1-bit-wide row and column index registers that locate a video-overlay window within a frame buffer.

FIG. 3 shows 1-bit-wide row and column index registers that locate a video-overlay window within a frame buffer. Frame buffer 20 is generated by an OS or other software and is stored in a memory. Frame buffer 20 has lines of pixels that are divided into blocks having multiple rows and columns of pixels. The blocks are shown by the dashed lines.

The blocks correspond to bits in row index register 36 and column index register 38. There are 16 bits in row index register 36, so there are 16 blocks in the horizontal (x) direction. Row index register 36 has 12 bits, so there are 12 blocks in the vertical (y) direction. For a display with 640 pixels per line, and 480 lines, each block has 640/16 or 40 pixels wide, and 480/12 or 40 pixels (lines) high.

When a first frame is refreshed (displayed) after the video-overlay window is created, moved, altered, or destroyed, the location of color-key pixels is detected and used to set and clear the indicator bits in row index register 36 and column index register 38. On subsequent frames, index registers 36, 38 can be used to skip fetching of graphics pixels for blocks that are wholly within the video-overlay window.

When both the row and column indicator bits for a block are set to 1, all pixels in the block are color-key pixels. The block has only color-key pixels, so fetching of graphics pixels from the frame buffer memory can be skipped. When either the row or column indicator bit is a 0, then the whole block of graphics pixels is fetched from memory.

Blocks outside of video-overlay window 34, or having the border of video-overlay window 34 pass through, have one or both row and column indicator bits cleared to 0. Blocks wholly within video-overlay window 34 generally have both row and column indicator bits set to 1.

However, some of video-overlay window 34 is obscured by a graphical element, such as by drop-down menu 22 or logo 32. Columns that contain obscuring elements such as drop-down menu 22 and logo 32 have their column indicator bits cleared to 0, even though some blocks in the column have only color-key pixels.

The limited number of indicator bits causes some inefficiency. For example, regions 24, 28 are efficiently coded by row index register 36 and column index register 38, since all whole blocks within regions 24, 28 have 1's in both the row and column index registers. However, region 26 is inefficiently coded. While the row indicator bits for region 26 are set to 1, the column indicator bits are 0 for region 26. Graphics pixels are fetched from memory for all of the 14 blocks in region 26, even though these 14 blocks contain only color-key pixels.

Likewise, region 30, which shares columns with logo 32, is inefficient. The 21 blocks in region 30 are all fetched from memory, even though these blocks contain only color-key pixels.

Overall, of the 80 blocks completely within video-overlay window 34 and not obstructed by drop-down menu 22 or logo 32, only the 45 blocks in regions 24, 28 have both row and column indicator bits set to 1, and thus can skip fetching of their graphics pixels from memory. Blocks in regions 26, 30 (B2, B1) have all their graphics pixels fetched, even though they contain only color-key pixels. Thus when some of video-overlay window 34 is obscured by drop-down menu 22 and logo 32, efficiency is drastically reduced to 56% in this example.

Figure 4:
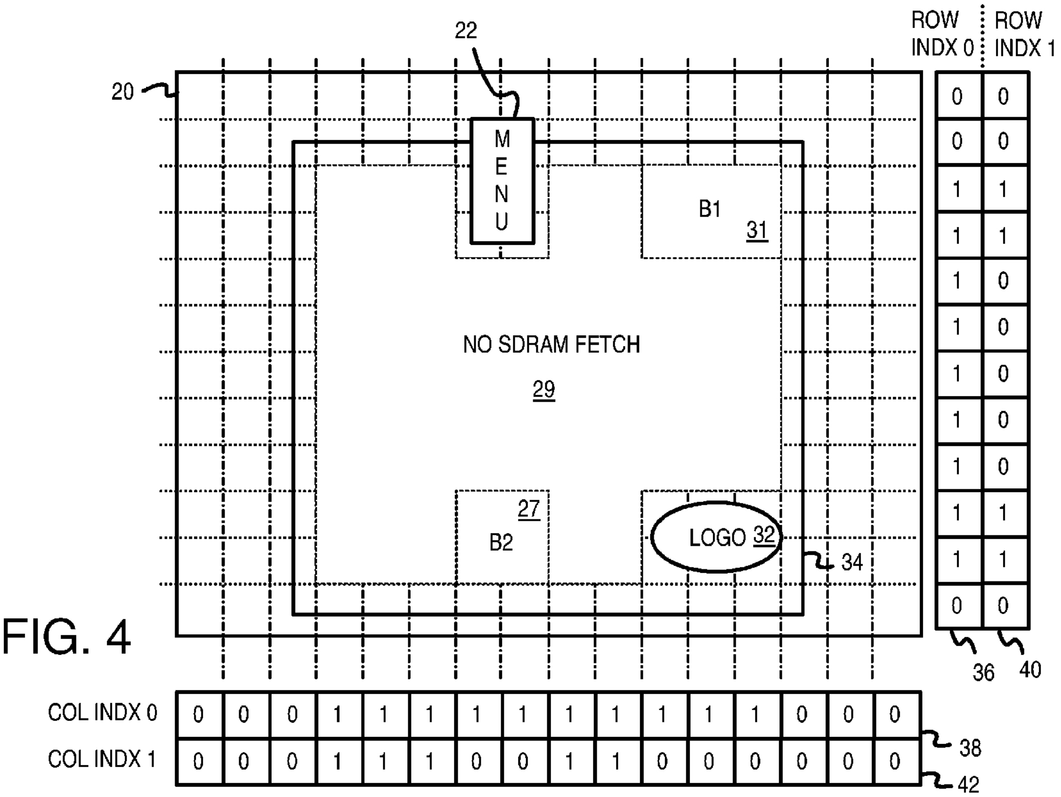
FIG. 4 shows 2-bit-wide row and column index registers that locate a video-overlay window within a frame buffer.

FIG. 4 shows 2-bit-wide row and column index registers that locate a video-overlay window within a frame buffer. Each row of blocks now has 2 indicator bits, and each column of blocks also has 2 indicator bits. The additional indicator bits can increase coding efficiency.

Row index bit 0 is stored in row index register 36, while row index bit 1 is stored in second row index register 40. Column index bit 0 is stored in column index register 38, while column index bit 1 is stored in second column index register 42. Row index bit 0 is read first and in the same manner as described earlier for row index register 36. When row index bit 0 is 0, then all graphics pixels in the row of blocks are fetched, and the other indicator bits are ignored, including column index bits and row index bit 1.

When row index bit 0 is 1, then row index bit 1 in second row index register 40 is used to select either column index bit 0 from column index register 38, or column index bit 1 from second column index register 42. When row index bit 1 is 0, column index bit 0 is selected for reading, while when row index bit 1 is 1, column index bit 1 is selected for reading.

The selected column index bit determines whether fetching of graphics pixels in the corresponding block can be skipped: when the selected column index bit is 1 the graphics pixels are skipped, while when the selected column bit is 0, graphics pixels are fetched.

In the example of FIG. 4, the first two rows of blocks have row index bit 0 equal to 0, so all pixels are fetched in these lines. For the third row of blocks, row index bit 0 is 1, so additional index bits must be consulted. Row index bit 1 for this third row of blocks is 1, so column index bits 1 from second column index register 42 are selected; column index bits 0 from column index register 38 are ignored for all columns in the third row of blocks.

The column index bit 1 is set to 1 for block-columns 3-5 and 8,9, so blocks 3-5 and 8,9 in the third row of blocks have only color-key pixels in these blocks, which do not have to be fetched. Thus fetching of graphics pixels is skipped for block-columns 3-5 and 8,9 in the third block-row. The fourth row of blocks has the same coding of row index bits 0, 1, so again column index bits 1 from second column index register 42 are selected, and the same block-columns 3-5 and 8,9 are skipped in the fourth row of blocks.

For the fifth row of blocks, row index bit 0 is 1, so row index bit 1 is consulted. Row index bit 1 for this fifth row of blocks is 0, so column index bits 0 from column index register 38 are selected; column index bits 1 from second column index register 42 are ignored for all columns in the fifth row of blocks.

The column index bit 0 is set to 1 for block-columns 3-12, so blocks 3-12 in the fifth row of blocks have only color-key pixels in these blocks, which do not have to be fetched. Thus fetching of graphics pixels is skipped for block-columns 3-12 in the fifth block-row.

Block-rows 6-9 have the same coding of row index bits 0, 1 as the fifth row, so blocks 3-12 in block-rows 5-9 all can skip fetching of graphics pixels in block-columns 3-12.

For the 10th row-block, row index bit 0 is 1 and row index bit 1 is also 1, causing column index bits 1 from column index register 38 to be selected. Column index register 38 has a 1 indicator bit for block-columns 3-5 and 8,9, which can have fetching skipped in the 10th row of blocks. The 11th row of block has the same encoding as the 10th row, and also can skip fetching of graphics pixels in block-columns 3-5 and 8,9.

Having two column indicator bits for each block-column increases coding efficiency, since it doubles the number of possible column codings. Block-rows within video-overlay window 34 that have no overlap or obstruction from graphics elements can be coded using one of the column index registers, while block-rows that are partially obscured by drop-down menu 22 or logo 32 can use a second coding stored in the other column index register. In this example, block-rows 5-9 with no obstructions are coded by column indicator bits stored in column index register 38, while block-rows 3-4 and 10-11 that are partially obscured by drop-down menu 22 or logo 32 are coded by column indicator bits stored in column index register 42.

Inefficient regions B1, B2 have shrunk considerably from FIG. 3. Region 31 (B1) is only 6 blocks instead of 21 blocks, so only 6 blocks are fetched that have all color-key pixels for these block-columns. Region 27 (B2) is only 4 blocks instead of 14 blocks, so only another 4 blocks are fetched that have all color-key pixels for these block-columns. Efficient region 29 has grown to 70 blocks, or 87% of the 80 un-obscured blocks fully within video-overlay window 34. This 87% efficiency is a significant gain from the 56% efficiency of FIG. 3.

Figure 5:
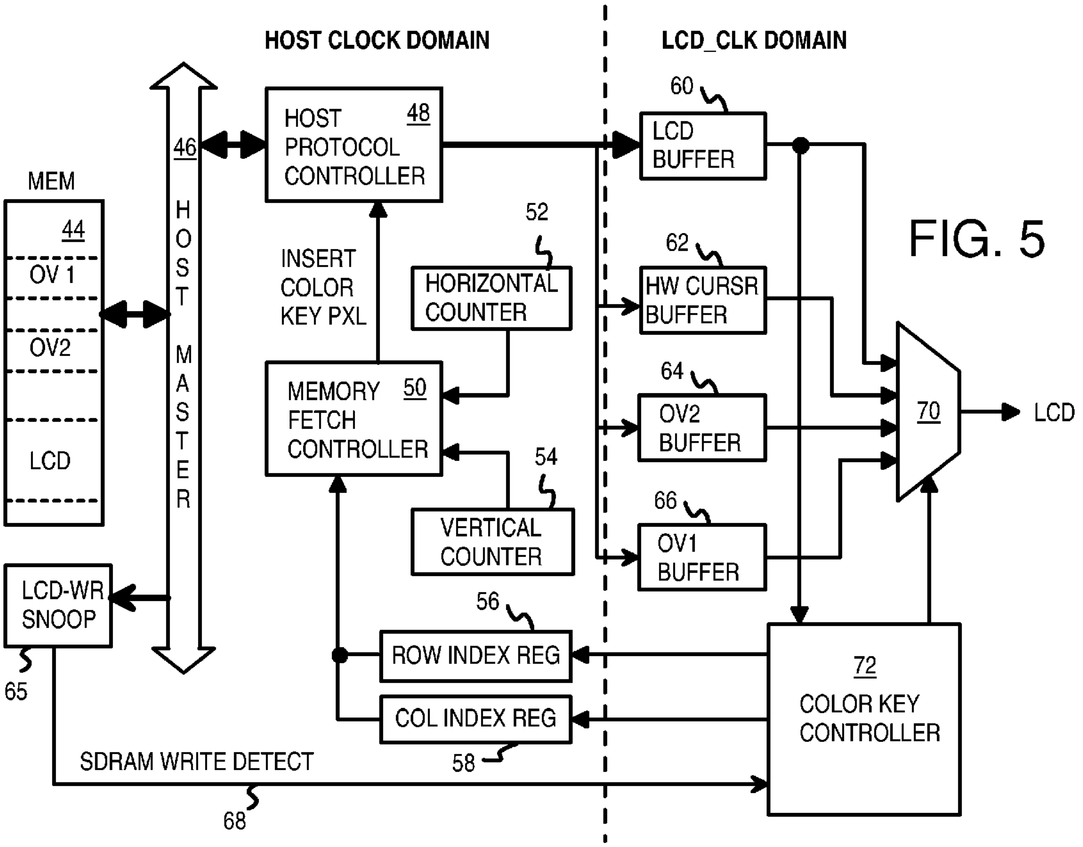
FIG. 5 is a block diagram of a graphics system that uses row and column index registers to skip fetching of graphics pixels from memory within a video-overlay window.

FIG. 5 is a block diagram of a graphics system that uses row and column index registers to skip fetching of graphics pixels from memory within a video-overlay window. Memory 44 is one or more physical memories that store graphics pixels in an liquid crystal display (LCD) frame buffer and video pixels in one or more overlay buffers OV1, OV2. A host such as a processor on a personal computer writes graphics pixels to the frame buffer in memory 44 to update the display. Snooper 65 detects these writes to the frame buffer on host bus 46 and generates write-detect signal 68 to color-key controller 72.

During display refresh, graphics pixels are fetched in a scan order from the frame buffer in memory 44 by host protocol controller 48. These graphics pixels are buffered by LCD buffer 60 before being sent to the LCD display through output mux 70.

The graphics pixels are also sent to color-key controller 72 from LCD buffer 60. The graphics pixels are compared to the color-key value. When the graphics pixels match the color key, color-key controller 72 instructs output mux 70 to switch and send video pixels from overlay buffer 66 to the display screen. When a second overlay window is used, a second color-key value may be used to select video pixels from second overlay buffer 64. Pixels representing a cursor may similarly be displayed by output mux 70 selecting cursor pixels from hardware cursor buffer 62.

Video pixels may be fetched from video buffers in memory 44 by 48 and written to overlay buffers 64, 66. Hardware cursor pixels may likewise be written to hardware cursor buffer 62, either from memory 44 or from the host.

Memory fetch controller 50 uses horizontal counter 52 and vertical counter 54 to track fetching of graphics pixels from memory 44 into LCD buffer 60 by host protocol controller 48. The x and y coordinates of the pixel to be fetched are stored or generated by counters 52, 54.

Row index register 56 is consulted by memory fetch controller 50 for blocks of x,y coordinates to determine when the current row of blocks contains some blocks in the video-overlay window. When the row indicator bit for the line to be fetched is a 1, the second row index bit is used to select column index bits from column index register 58. The column bits selected from column index register 58 indicate when a block-column contains only color-key pixels. These color key pixels do not have to be fetched from memory 44. Instead, memory fetch controller 50 generates a dummy color-key pixel that is sent to LCD buffer 60.

The dummy color-key pixels inserted into LCD buffer 60 by memory fetch controller 50 match the color key when sent to color-key controller 72 and to output mux 70. Color-key controller 72 then switches output mux 70 to select the video pixel from overlay buffers 64, 66. Thus the dummy color-key pixels inserted by memory fetch controller 50 emulate the function of actual color-key pixels that would have been fetched from memory 44.

When snooper 65 detects a host write to the frame buffer, and write-detect signal 68 is activated, color-key controller 72 prevents memory fetch controller 50 from inserting any dummy color-key pixels for the next frame after the update. Instead, color-key controller 72 maps locations of color-key pixels in the next frame and updates row index register 56 and column index register 58 to correspond to locations of all-color-key blocks in the new frame. On the following frames after this next frame, memory fetch controller 50 again inserts dummy color-key pixels and skips fetching the actual color-key pixels from memory 44 for these blocks.

Figure 6:
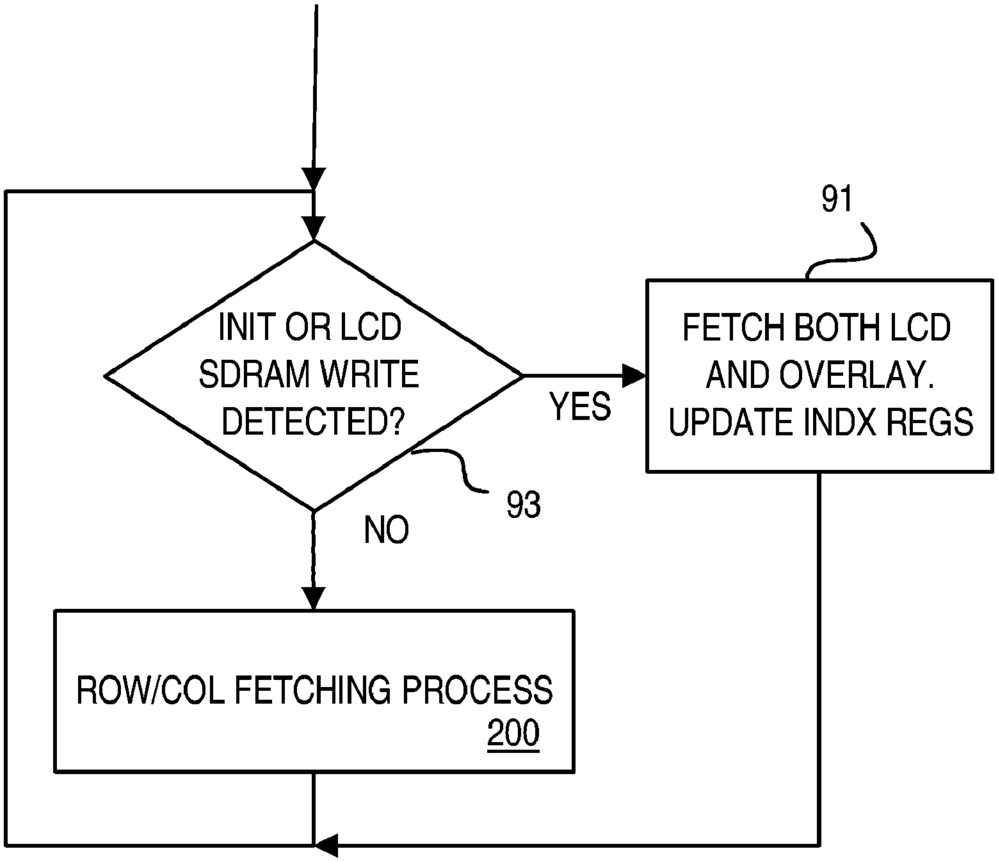
FIG. 6 is a flowchart of high-level operation of a graphics system with row and column index registers.

FIG. 6 is a flowchart of high-level operation of a graphics system with row and column index registers. When the system is initialized or when the host writes to the frame buffer, step 93, the memory fetch controller is prevented from skipping memory fetches and inserting dummy color-key pixels for the next frame. Instead, the row and column index registers are updated to reflect the position of the video-overlay window and any obstructing graphical elements, step 91.

Figure 7:
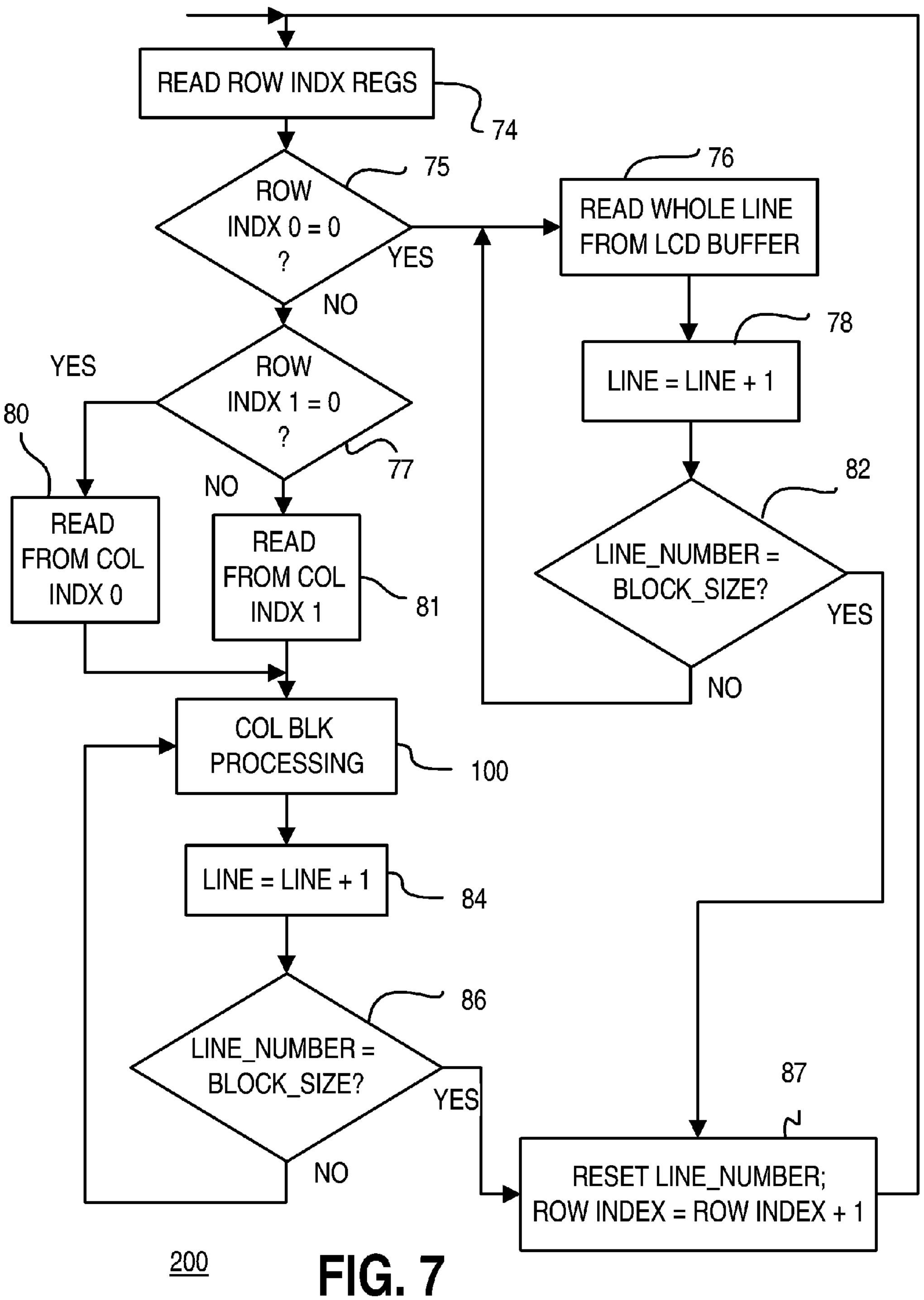
FIG. 7 is a flowchart of a row/column fetching process that inserts dummy color-key pixels in response to row and column registers.
Figure 8:
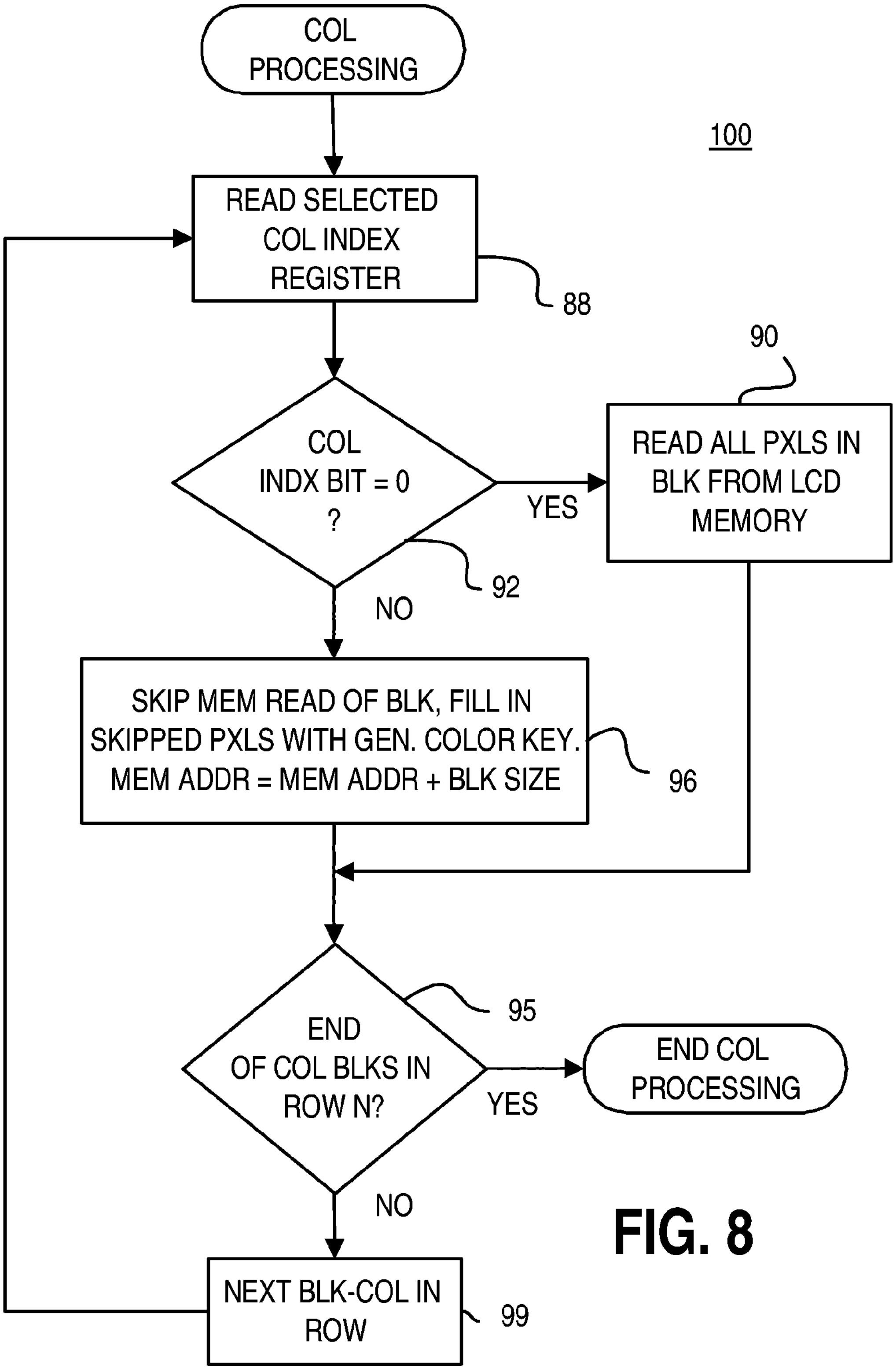
FIG. 8 is a flowchart of column block processing that inserts dummy color-key pixels in response to row and column registers.

When the new frame is the same as the prior frame, which occurs when no write to the frame buffer has occurred, step 93, then row/column fetching process 200 of FIGS. 7-8 is used. Dummy color-key pixels are inserted to avoid double-fetching at locations indicated by row and column index registers.

FIG. 7 is a flowchart of a row/column fetching process that inserts dummy color-key pixels in response to row and column registers. Row/column fetching process 200 can be executed for each frame that has not changed from the prior frame. The row index registers are read, step 74, for the current row of blocks, or block-row.

When row index bit 0 for this block-row is 0, step 75, then the whole line of pixels is fetched from frame-buffer memory, step 76. The line number is incremented, step 78, until the line number reaches the number of lines in a block, such as 16 lines for 16×16 pixel blocks, step 82. The line number is reset and the next row index from the row index registers is selected, step 87. Then the next block-row is processed from step 74.

When row index bit 0 is a 1, step 75, then row index bit 1 is used to select one of the column index registers. When row index bit 1 is a 0, step 77, then column index bits 0 are selected for reading, step 80. Otherwise, when row index bit 1 is a 1, step 77, then column index bits 1 are selected for reading, step 81. Column block processing 100, shown in FIG. 8, uses the selected column index bits, either column index 0 or column index 1.

After column block processing 100, the line number is incremented, step 84. Column block processing 100 is repeated for other lines in the row of blocks, step 86, until the line number reaches the number of lines in a block, such as 16 lines for 16×16 pixel blocks, step 86. The line number is then reset and the next row index from the row index registers is selected, step 87. Then the next block-row is processed from step 74 until all lines in the frame have been processed. Then the row number can be reset and row/column fetching process 200 repeated for a new frame.

FIG. 8 is a flowchart of column block processing that inserts dummy color-key pixels in response to row and column registers. Row/column fetching process 200 is called by column block processing 100 for each column of blocks in a row that has its row index bit 0 set to 1. For 16×16 pixel blocks, column block processing 100 is called once per block but processes 16 columns of pixels.

The column index register selected by the row index bit 1 is read, step 88, either column index register bit 0 or column index register bit 1, for the current block-column. When the selected column index bit is 0, step 92, then all pixels in the block are fetched from frame-buffer memory, step 90. Any color-key pixels stored in the frame buffer memory are also fetched from memory and cause video pixels to replace them. Thus some double-fetching can occur for these blocks. These blocks can be partially loaded with color-key pixels and partially with graphics pixels.

When the selected column index bit is 1, step 92, then none of the graphics pixels in the block are fetched from frame-buffer memory. Instead, dummy color-key pixels are generated by the graphics controller and inserted into the LCD buffer, step 96. These dummy color-key pixels later match the color key and cause the output mux to select video pixels. The entire block is within the video-overlay window and has only color-key pixels. The memory address for fetching graphics pixels from the frame-buffer memory can be incremented by the size of the block.

Double-fetching of both graphics and video pixels for these blocks is avoided. These blocks have only color-key pixels.

When the current block is the last block in the row of blocks, step 95, then column block processing 100 has completed, and control is returned to row/column fetching process 200. Otherwise the next block-column is processed, step 99, by repeating from step 88 with reading of the next column index bit in the column index registers. For example, when each row contains 40 blocks, column block processing 100 loops 40 times and reads 40 column index bits.

ALTERNATE EMBODIMENTS

Several other embodiments are contemplated by the inventors. For example the graphics pipeline may be implemented in a variety of ways and stages. Controllers may be implemented in hardware, firmware, software, or various combinations. Buffer may be separate first-in-first-out (FIFO) blocks or may be portions of a larger memory.

Blocks can have various sizes other than 40×40 pixels, For example, each block may be 16×16 pixels, or 8×8 pixels, or some other size. The x and y values do not have to be the same. While a flat-panel or LCD display has been described, cathode-ray tube (CRT), plasma, or other display technologies may be substituted. Pixels may be fetched from memory or transferred at various stages as a burst of many pixels rather than individually.

Various clocking schemes may be used. In FIG. 5, memory 44, host bus 46, memory fetch controller 50, and host protocol controller 48 operate using a host clock, while color-key controller 72 and output mux 70 operate using the display clock. Buffers 60, 62, 64, 66, are written using the host clock and read using the display clock. However, other clocking divisions may be used, and various divisions and derivatives of clocks may be used at various stages.

The color-key value may have different values and different colors at different times. The color key could have a range of values or multiple values rather than a single value of color. The OS or other software may change the color value for the color key, depending on what is being displayed. For example, red might be used as the color key when a blue color scheme is used for the menus and graphical elements, but an orange-valued color key could be used when the display scheme is changed to a sunset motif. The indicator bits could be active-high or active-low and could also be encoded or compressed.

A third and a fourth column index register could be added along with a third row index bit. Then 2 row index bits could select from the four column index registers. Other extensions and encoding of bits are possible, Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A graphics system comprising:

a graphics first-in-first-out (FIFO) for storing graphics pixels that are computer-generated;

a memory fetch controller that reads graphics pixels from a frame-buffer memory and writes the graphics pixels to the graphics FIFO;

a video FIFO that buffers video pixels for display in a video-overlay window;

a multiplexer that sends graphics pixels from the graphics FIFO to a display in response to a mux signal in a first state and sends video pixels from the video FIFO to the display in response to the mux signal in a second state;

a comparator, receiving graphics pixels from the graphics FIFO, for activating the mux signal in the second state when a graphics pixel matches a predetermined color key;

a row index register having a plurality of row indicator bits, each row indicator bit for a group of M display lines of pixels;

a column index register having a plurality of column indicator bits, each column indicator bit for a group of N display columns of pixels; and a fetch inhibitor that disables the memory fetch controller from reading graphics pixels from the frame-buffer memory for a block of N×M graphics pixels when a row indicator bit and a column indicator bit for the block both indicate that the block contains only graphics pixels that match the pre-determined color-key;

wherein M and N are whole numbers of at least 2, whereby fetching of the frame-buffer memory is disabled in response to row and column indicator bits.

2. The graphics system of claim 1 further comprising:

a dummy-pixel generator that writes dummy pixels matching the predetermined color-key to the graphics FIFO when the fetch inhibitor has disabled the memory fetch controller from reading from the frame-buffer memory.

3. The graphics system of claim 2 wherein the frame-buffer memory stores pixels for display as Y lines of X pixels per line, wherein X and Y are whole numbers;

wherein the row index register stores a plurality of Y/M row indicator bits;

wherein the column index register stores a plurality of X/N column indicator bits.

4. The graphics system of claim 3 wherein M is equal to N.

5. The graphics system of claim 2 further comprising:

a selecting row index register having a plurality of row selector bits, each row selector bit for a group of M display lines of pixels;

wherein the column index register comprises a first column bit and a second column bit for each group of N display columns of pixels;

wherein the row selector bit selects either the first column bit or the second column bit as the column indicator bit, whereby multi-bit row and column index registers disable fetching of the frame-buffer memory.

6. The graphics system of claim 5 wherein the frame-buffer memory stores pixels for display as Y lines of X pixels per line, wherein X and Y are whole numbers;

wherein the row index register stores a first plurality of Y/M row indicator bits and a second plurality of Y/M row selector bits;

wherein the column index register stores a plurality of 2*X/N column bits.

7. The graphics system of claim 5 further comprising:

a bus snooper, coupled to snoop a bus to the frame-buffer memory, the bus snooper signaling a frame update when a host writes updated pixels to the frame-buffer memory;

the fetch inhibitor being disabled for a frame when the frame update is signaled by the bus snooper;

whereby all graphics pixels are fetched from the frame-buffer memory after a frame update.

8. The graphics system of claim 7 further comprising:

a color-key controller, coupled to the bus snooper, for writing updated indicator bits to the row index register and to the column index register to reflect changes in locations of graphics pixels that match the predetermined color key.

9. The graphics system of claim 8 wherein changes in a location of a video-overlay window or obstructions of the video-overlay window by a drop-down menu cause changes in locations of graphics pixels that match the predetermined color key.

10. A method for fetching pixels for display comprising:

(a) reading a primary row indicator bit for a group of M lines of pixels;

(b) reading graphics pixels in the group of M lines from a frame-buffer memory and writing the graphics pixels into a display buffer when the primary row indicator bit for the group of M lines is in a first state;

(c) when the primary row indicator bit for the group of M lines is in a second state, reading a column indicator bit for each block-column of N pixels per line in the group of M lines;

(d) when the column indicator bit for a block-column is in a first state, reading graphics pixels in the block-column for the group of M lines from the frame-buffer memory and writing the graphics pixels into the display buffer;

(e) when the column indicator bit for the block-column is in a second state, disabling reading of graphics pixels from the frame-buffer memory for the block-column for the group of M lines, and writing dummy color-key pixels into the display buffer;

(f) repeating steps (d) and (e) for each block-column in a plurality of block-columns in the group of M lines;

repeating steps (a) to (f) for each group of M lines in a display frame;

(g) reading graphics pixels and dummy color-key pixels from the display buffer and comparing pixels to a color key; and (h) when the graphics pixel or the dummy color-key pixel is a matching pixel having a color value that matches the color key, discarding the matching pixel and sending a video pixel to a display device in place of the matching pixel;

repeating steps (g) and (h) for all pixels in the display frame, whereby fetching graphics pixels from the frame-buffer memory is disabled for a block of M lines and N pixels in response to the primary row indicator bit and the column indicator bit both being in the second state.

11. The method of claim 10 further comprising:

reading a secondary row indicator bit when the primary row indicator bit for the group of M lines is in a second state, wherein the secondary row indicator bit being in a first state selects for reading a first column indicator bit as the column indicator bit;

wherein the secondary row indicator bit being in a second state selects for reading a second column indicator bit as the column indicator bit, whereby the secondary row indicator bit selects from among two column indicator bits for each block-column.

12. The method of claim 11 further comprising:

reading video pixels from a video-overlay buffer, the video pixels replacing matching pixels in a video-overlay window portion of a display screen in response to the matching pixels that match the color key.

13. The method of claim 12 wherein blocks that have the primary row indicator bit and the column indicator bit both being in the second state are completely within the video-overlay window portion of the display screen.

14. The method of claim 13 wherein the group of M lines comprises 4 or more display lines and wherein block-columns of N pixels per line comprise 4 or more pixels per line, wherein blocks of M lines and N pixels are at least 4×4 blocks with at least 16 pixels.

15. The method of claim 14 further comprising:

detecting a write of an updated graphics pixel to the frame-buffer memory and signaling a frame update;

for a frame after a frame update is signaled, preventing disabling of reading of graphics pixels from the frame-buffer memory, and preventing writing dummy color-key pixels into the display buffer when the frame update is signaled;

updating the primary row indicator bits and the column indicator bits in response to the frame update, whereby indicator bits are updated when a frame update occurs.

16. The method of claim 15 further comprising:

snooping a host bus to the frame-buffer memory to detect the write of the updated graphics pixel to the frame-buffer memory.

17. A pixel pipeline with reduced fetching for video overlay comprising:

frame buffer means for storing graphics pixels for display as Y lines of X pixels per line, wherein the graphics pixels are logically divided into rows of M lines per row, and columns that are N pixels wide, wherein the rows and columns define blocks of M by N pixels;

first row register means for storing first row indicator bits;

column register means for storing column indicator bits;

wherein a first row indicator bit indicates when a corresponding row contains at least one block completely within a video-overlay window;

wherein a column indicator bit indicates when a corresponding column contains at least one block completely within the video-overlay window;

graphics buffer means for storing graphics pixels read from the frame buffer means before display;

video buffer means for storing video pixels read for display within a video-overlay window before display;

color key means for indicting a pixel color of matching graphics pixels overlaid by the video pixels, the matching graphics pixels defining a location of the video-overlay window;

color-key compare means, coupled to the graphics buffer means and to the color key means, for comparing graphics pixels to the color key means and generating a match signal for matching graphics pixels;

multiplexer means for selecting the video pixels from the video buffer means in response to the match signal and for otherwise selecting graphics pixels from the graphics buffer means for display by a display device; and memory fetch controller means for fetching graphics pixels from the frame buffer means and for writing to the graphics buffer means, and for generating dummy matching pixels and not fetching a current block from the frame buffer means in response to the first row indicator bit and the column indicator bit both indicating that the current block is completely within the video-overlay window;

wherein X, Y, M, and N are whole numbers;

whereby fetching of graphics pixels in the current block is avoided and dummy matching pixels written to the graphics buffer means in response to the first row indicator bit and the column indicator bit.

18. The pixel pipeline with reduced fetching for video overlay of claim 17 further comprising:

second row register means for storing second row indicator bits;

wherein a second row indicator bit indicates a selector bit;

wherein the column register means further comprises:

first column register means for storing first column bits;

second column register means for storing second column bits;

wherein the selector bit from the second row register means selects either the first column register means or the second column register means to supply the column indicator bit for the corresponding column, whereby two column bits are used for each column.

19. The pixel pipeline with reduced fetching for video overlay of claim 18 wherein a number of rows is Y/M;

wherein a number of columns is X/N;

wherein Y/M and X/N are whole numbers.

20. The pixel pipeline with reduced fetching for video overlay of claim 19 wherein M and N are equal.

* * * * *